United States Patent

Jung et al.

[11] Patent Number: 5,956,226
[45] Date of Patent: Sep. 21, 1999

[54] ELECTROCHEMICAL CAPACITOR USED FOR THERMAL MANAGEMENT

[75] Inventors: Richard H. Jung, Park Ridge; Gretchen E. Fougere, Glencoe; Darioush Keyvani, Mount Prospect; Lijun Bai, Vernon Hills; Hitendra Patel, Chicago, all of Ill.

[73] Assignee: Motorola, Inc., Schaumuburg, Ill.

[21] Appl. No.: 08/942,106

[22] Filed: Oct. 1, 1997

[51] Int. Cl.⁶ ....................................................... H01G 2/08
[52] U.S. Cl. ........................... 361/514; 361/697; 361/709; 361/704; 361/695
[58] Field of Search ................................. 361/282, 274.3, 361/329, 701, 703, 704, 706, 708, 709, 710, 722, 714, 705, 694, 695, 697, 721, 707, 511, 512, 514, 530, 509; 257/706, 707, 717, 722, 721; 174/16.1, 16.3; 165/80.2, 80.3

[56] References Cited

U.S. PATENT DOCUMENTS

| | | |
|---|---|---|
| 3,670,210 | 6/1972 | Blase ........................................ 361/514 |
| 4,536,819 | 8/1985 | Deutsch ..................................... 361/514 |
| 5,422,788 | 6/1995 | Heinen et al. ............................ 361/722 |
| 5,661,902 | 9/1997 | Katchmar ................................... 29/840 |

Primary Examiner—Kristine Kincaid
Assistant Examiner—Anthony Dinkins
Attorney, Agent, or Firm—Felipe J. Farley

[57] ABSTRACT

An electronic device (220) includes a component (105), such as a microprocessor, that generates heat and an electrochemical capacitor (200) used for thermal management. The electrochemical capacitor (200) has a first region, preferably the perimeter region, including electroactive material (160) and an electrolyte (165) and also has a second region, preferably the inner region, including heat sink material (170). When the component (105) and the electrochemical capacitor (200) are mounted within the device (220), the heat sink material (170) of the capacitor (200) is aligned with the component (105).

16 Claims, 4 Drawing Sheets

ELECTROCHEMICAL CAPACITOR USED FOR THERMAL MANAGEMENT

TECHNICAL FIELD

This invention relates in general to heat generation by electrical components, and more specifically to thermal management of such generated heat.

BACKGROUND

Electrical components, such as microprocessors, often generate heat that can be difficult to dissipate within enclosed electronic devices, such as computers, battery packs, telephones, pagers, etc. Dissipation of such generated heat is a necessity, however, since high temperatures can cause failure of some components. As a result, heat generating components are typically mounted near an outer wall of an electronic device that includes the components. Small heat exchangers and fans can also be mounted near a heat generating component to dissipate heat.

As electronic devices become smaller and lighter in weight, dissipation of generated heat becomes more difficult because there is less space to custom place heat generating components or to mount additional components, such as heat exchangers and fans. Thus, what is needed are new ways to manage heat generated by components in small electronic devices.

DETAILED DESCRIPTION OF THE PREFERRED EMBODIMENT

Figure 1:
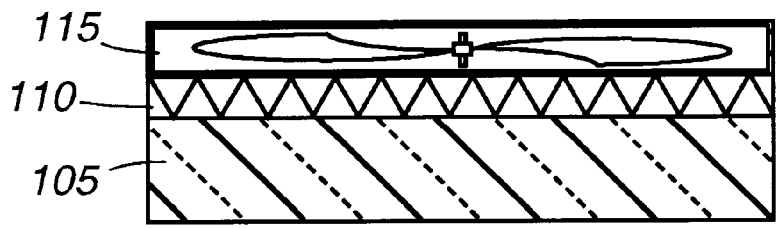
FIG. 1 is a side view of a conventional configuration for managing heat generated by an electrical component.

While the specification concludes with claims defining the features of the invention that are regarded as novel, it is believed that the invention will be better understood from a consideration of the following description in conjunction with the drawing figures, in which like reference numerals are carried forward.

FIG. 1 is a side view of a conventional assembly for thermally managing heat generated by an electrical component, such as a microprocessor 105 or a power amplifier. Typically, a microprocessor 105, such as a Intel 486, operates at about 5 amps (A) and peaks at 11 A with a voltage of 3 volts (V), generating 30 watts (W) of power. This heat will be transferred to any devices in the proximity of the microprocessor 105 and can shorten the life of the microprocessor 105 and nearby devices. To avoid this result, the heat is directed to a finned heat exchanger 110 that is often equipped with a fan 115 for forced convection.

Complex electronic devices, such as computers and portable telephones also include numerous other device components that must share available space with the heat generating component 105, e.g., the microprocessor, the heat exchanger 110, and the fan 115. Therefore, device layout and component placement is critical for both optimal space usage and thermal management.

Figure 2:
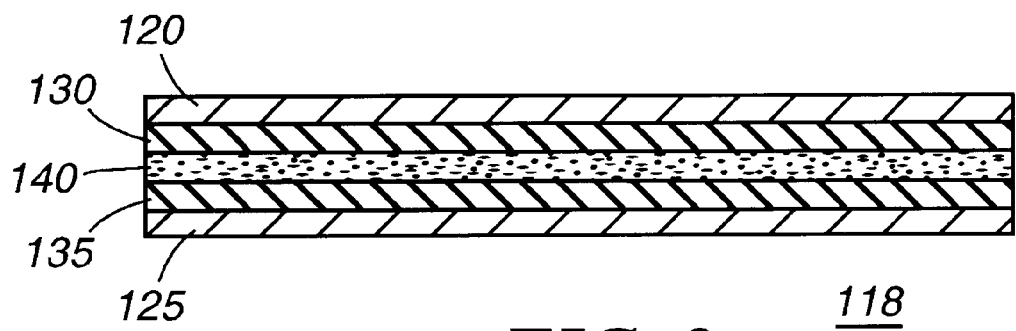
FIG. 2 is a side, cutaway view of a conventional capacitor.

FIG. 2 depicts a side, cutaway view of conventional capacitor 118, such as an electrochemical capacitor, that is often utilized in electronic devices that include heat generating components. The capacitor 118 includes first and second electrically conductive substrates 120, 125, between which electroactive material layers 130, 135 and an electrolyte layer 140 are positioned. Although often used in conjunction with a microprocessor 105, the conventional capacitor 118 is not very useful for thermal management.

Figure 3:
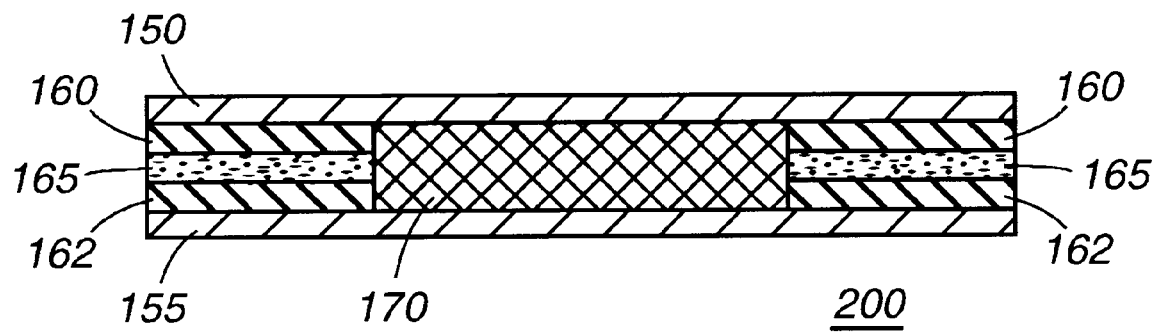
FIG. 3 is a side, cutaway view of a capacitor manufactured in accordance with the present invention.

FIG. 3 is a side, cutaway view of a capacitor 200, such as an electrochemical capacitor, that is manufactured to dissipate heat in accordance with the present invention. The capacitor 200 comprises first and second electrically conductive substrates 150, 155 between which electroactive material layers 160, 162 and an electrolyte layer 165 are positioned in a first region. Preferably, the capacitive material, which includes the electroactive material and the electrolyte, is concentrated between perimeter regions of the substrates 150, 155, while inner regions of the capacitor 200 are filled with a heat sink material 170 that is thermally conductive and electrically insulative and that has a thickness equivalent to the electroactive material layers 160, 162 and the electrolyte layer 165. Preferably, the heat sink material has a minimum thermal conductivity of 0.055 (W/(m °K).

The heat sink material 170 can be, for instance, a ceramic-filled adhesive, such as a thermal grease adhesive, a polyamide film, a Thermabond™ compliant, heat sink adhesive, or a K-Therm™ adhesive. Other heat sink materials include alumina ($Al_2O_3$), berylia (BeO), calcium oxide (CaO), magnesia (MgO), and aluminum nitride (AlN), all of which have thermal conductivities close to those of many metals and exceeding those of some plastic materials, such as celluloid, polystyrene foam, mylar foil, nylon, teflon, and urethane foam. Depending upon which material is selected for use, the heat sink material 170 can be conveniently screen printed or coated onto the substrate 155.

The capacitor electrolyte 165, the electroactive materials 160, 162, and the substrates 150, 155, which can be symmetrical or asymmetrical, can be formed from conventional electrochemical capacitor materials. Preferably, the active area, i.e., the capacitive area, of the capacitor 200 comprises poor heat conducting electroactive and electrolyte materials that are operable at relatively high temperatures, such as about 300° Centigrade (C). For instance, a polybenzimidazole (PBI) electrolyte material can function at temperatures in excess of 300° C. The processes and materials used to construct the capacitive portions of the capacitor 200 can be, for instance, those disclosed in commonly assigned U.S. Pat. No. 5,568,353 issued Oct. 22, 1996 to Bai et al., entitled "ELECTROCHEMICAL CAPACITOR AND METHOD OF MAKING SAME", the teachings of which are hereby incorporated by reference.

Figure 4:
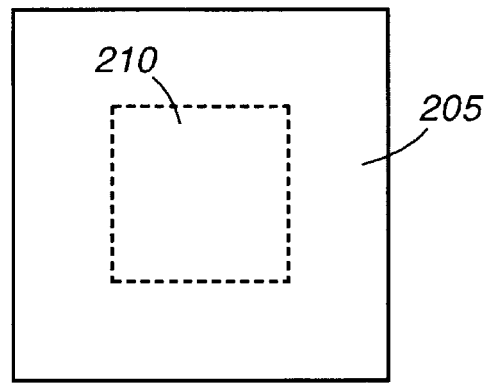
FIG. 4 is a top view of the capacitor of FIG. 3 in accordance with the present invention.

Referring next to FIG. 4, a top view of the capacitor 200 is shown, indicating that the capacitive portions 205 of the capacitor 200 are preferably included along the perimeter of the capacitor 200, i.e., within the outer regions of the capacitor 200, while the thermal management portion 210, i.e., the heat sink portion, of the capacitor 200 is preferably the inner region of the capacitor 200. It is also desirable that the inner, heat sink region of the capacitor 200 correspond to the footprint of the heat generating component 105 for which thermal management is required.

Figure 5:
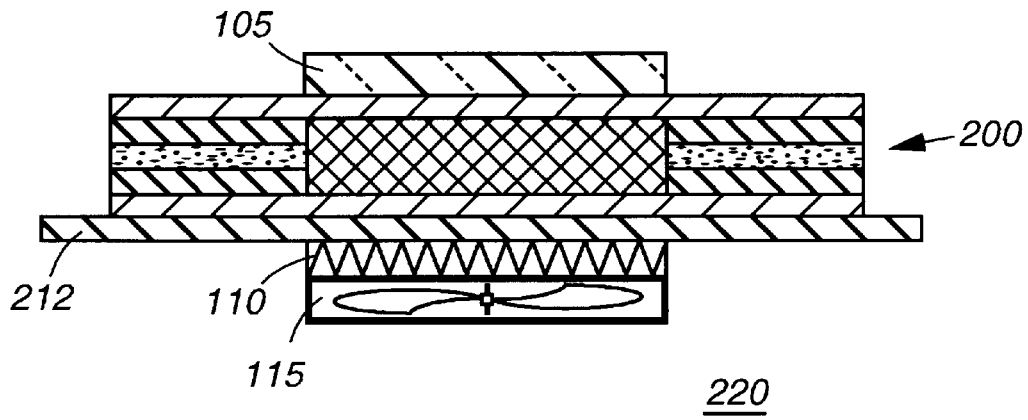
FIGS. 5–7 are side views of configurations for using the capacitor of FIG. 3 to thermally manage heat generated by an electrical component in accordance with the present invention.

FIG. 5 is a side view of a first configuration 220 into which the heat conducting component and the capacitor 200 can be assembled in accordance with the present invention. As shown, a printed circuit (pc) board 212 or other substrate of an electronic device includes the capacitor 200 mounted to a first surface thereof. The microprocessor 105 is then mounted on top of the capacitor 200 so that it is vertically aligned with and adjacent to the heat sink portion of the capacitor 200. On a second surface of the pc board 212 that is opposite the first surface, the heat exchanger 110 and fan 115 are mounted in alignment with the heat sink portion of the capacitor 200. The pc board 212 preferably includes heat conducting elements (not shown) for conducting heat through the pc board 212 to the heat exchanger 110. The heat conducting elements can be, for example, wires, leads, or via holes plated with heat conducting material.

In operation, heat is transferred down through the heat sink material of the capacitor 200 perpendicular to the active layers. The high aspect ratio of the capacitor layers and the direct path of the heat flow creates a low thermal resistance, R, given by the formula:

$$R = t/(k^*A),$$

where t is the thickness perpendicular to the heat path, A is the area of the heat sink region, and k is the thermal conductivity of the heat sink material.

Figure 6:
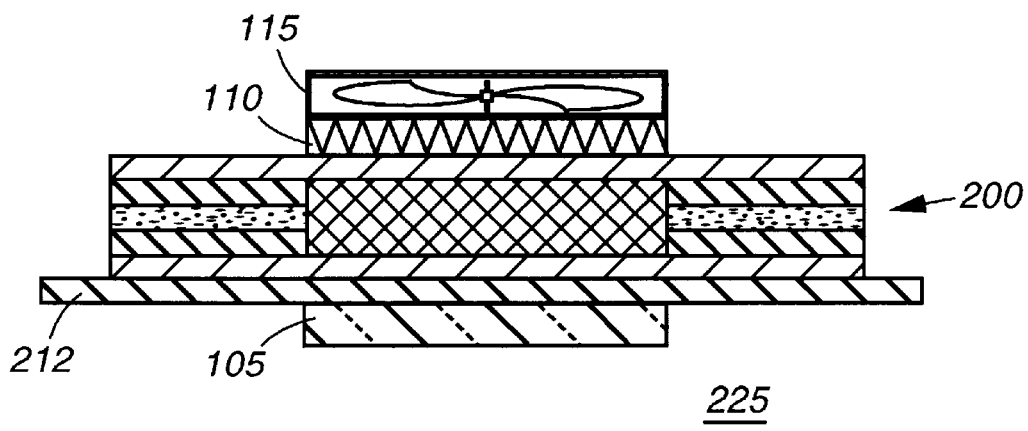

FIG. 6 is a side view of a second configuration 225 for the heat conducting component and the capacitor 200. In the configuration 225, the microprocessor 105 is mounted beneath the capacitor 200 and on the opposite side of the pc board 212 from the capacitor 200, while the heat exchanger 110 and the fan 115 are mounted on top of the capacitor 200. In this configuration, heat is advantageously transferred from the microprocessor 105 through the pc board 212 via heat conducting elements (not shown) and through the heat sink material of the capacitor 200 to the heat exchanger 110 and the fan 115.

Figure 7:
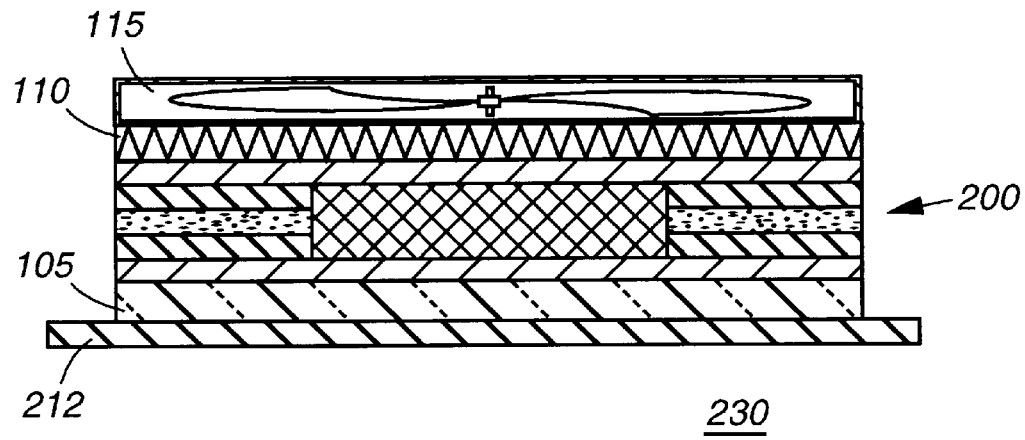

FIG. 7 is a side view of another configuration 230 for thermal management using the capacitor 200. As shown, the microprocessor 105 is mounted directly to the pc board 212 followed sequentially by the capacitor 200, the heat exchanger 110, and the fan 115. In this configuration, the capacitor footprint is shown as being approximately equivalent to the microprocessor footprint because mounting a larger capacitor 200 on top of a smaller microprocessor 105 would be more difficult. It will be appreciated by one of ordinary skill in the art that, in any of the configurations described herein, the capacitor 200 and the microprocessor 105 can have similar footprints, although it is more desirable for the footprint of the microprocessor 105 to match the footprint of the heat sink area of the capacitor 200.

In all the configurations described herein, an insulator (not shown) is preferably included between the surface of the capacitor 200 and any elements that are mounted on top of the capacitor 200 to prevent electrical shorts. Alternatively, if the package of the component to be mounted to the capacitor 200 or the capacitor surface itself is insulative, no additional insulator may be necessary. For instance, a capacitor label or the package of a microprocessor could be sufficient to serve as an insulator. It will also be appreciated that elements mounted on top of the capacitor 200 can be mounted by means of leads (not shown) that extend around the capacitor 200 to the pc board 212 on which the capacitor 200 is also mounted, or elements could be mounted directly to a substrate (not shown) adjacent to and on top of the capacitor 200. For instance, a flexible, thin polyamide substrate could be adhesively mounted to the top of the capacitor 200 so that a component, such as the heat exchanger 110 or the microprocessor 105 could be reflowed directly to pads formed thereon. A separate electrical connection could then be made between the polyamide substrate and the pc board 212.

Figure 8:
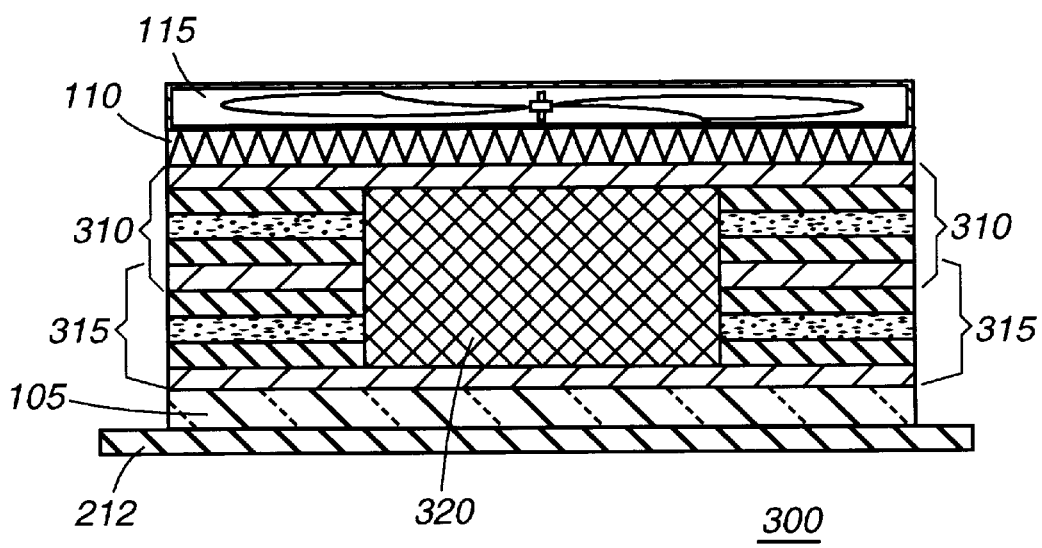
FIG. 8 is a side view of a multiple-cell capacitor manufactured in accordance with the present invention.

It will be further recognized that the single cell capacitor 200 described herein is for illustrative purposes only and that multiple capacitor cells could be stacked to form a multiple-cell capacitor, as shown in FIG. 8, that still fulfills thermal management purposes. By way of example, in the perimeter regions of the multiple layer capacitor 300, multiple electrode and electrolyte layers could be included between the two outer substrates to form multiple capacitor cells 310, 315, while inner regions could be filled with heat sink material 320. All that is important is that the capacitor, regardless of its configuration, include a region filled with heat sink material that can conduct heat through the capacitor.

Simulations were performed for different cooling elements, capacitor elements, and heat transfer materials, and results are set forth hereinafter.

Simulation I. The first simulation was of an Intel 486 microprocessor mounted directly to a bronze-finned heat exchanger and a fan without the use of an electrochemical capacitor in accordance with the present invention. The 0.9 W fan and the heat exchanger were each 10 millimeters (mm) thick, and it was determined that an 80° Kelvin (K) temperature drop would occur.

Simulation II–V. In these simulations, an electrochemical capacitor in accordance with the present invention was mounted to a heat exchanger and a fan in an effort to determine the appropriate materials that would dissipate at least 80° K. from a Pentium Pro microprocessor. In all simulations, a 0.9 W fan was used, and the fan and the heat exchanger were both 10 mm thick.

II. A 1.0 mm thick capacitor included a K-Therm™ thermal adhesive within the inner region. A 2.4 mm thick polyamide film was positioned between the capacitor and the heat exchanger as a thermally conductive, electrically insulative mounting adhesive. An 80° K. temperature drop was experienced. Additionally, an 80° K. temperature drop was also experienced for capacitors using a thermal grease adhesive and using a Thermabond™ adhesive.

III. A 1.0 mm thick capacitor included K-Therm™ thermal adhesive within the inner region. A 0.4 mm thick K-Therm™ mounting adhesive was positioned between the heat exchanger and the capacitor, and it was determined that the assembly would provide an 80° K. temperature drop.

IV. A 1.1 mm thick capacitor including 5 mil Aluminum endplates and K-Therm™ thermal adhesive was mounted directly to the heat exchanger, providing a 48° K. temperature drop.

V. 1.0 mm thick capacitors with thermal grease adhesive, K-Therm™, and Thermabond™ as the heat sink material were mounted directly to the heat exchanger, and it was determined that the assemblies would provide a 240° K. temperature drop.

It can be seen that all assemblies, with the exception of that described in Simulation IV, provide sufficient heat dissipation for use with a microprocessor. As a result, the electrochemical capacitor can be conveniently mounted in vertical alignment with the microprocessor so that no additional area on the pc board need be consumed. This type of configuration therefore provides for heat dissipation in a manner that also optimally uses the available space, which is often very constricted in small portable devices.

Figure 9:
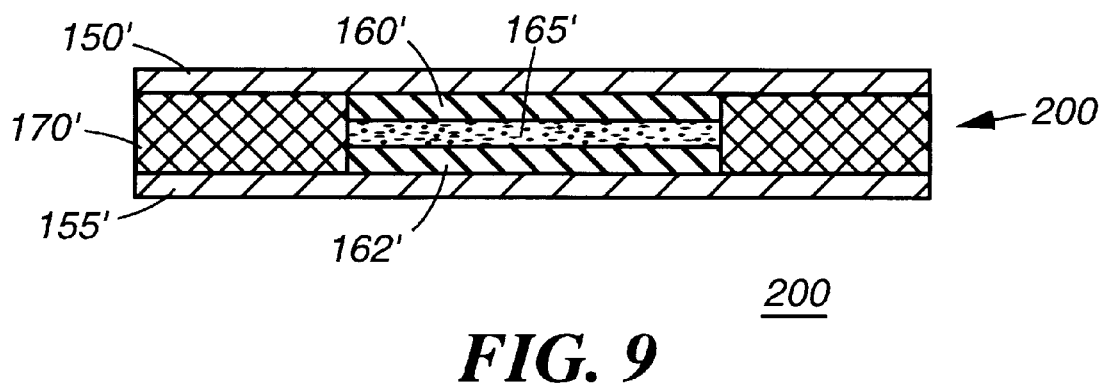
FIG. 9 is a side, cutaway view of a capacitor manufactured in accordance with an alternative embodiment of the present invention.

Referring next to FIG. 9, a different embodiment of a capacitor 200', such as an electrochemical capacitor, used for thermal management is shown. In accordance with an alternative embodiment of the present invention, the capacitive portion, i.e., the active layers, of the capacitor 200' are formed within interior regions, rather than perimeter regions, of the capacitor 200'. More specifically, the electroactive material layers 160', 162' and the electrolyte layer 165' are formed in the middle region between the capacitor substrates 150', 155'. The heat sink material 170' is positioned between the substrates 150', 155' around the perimeter of the capacitor 200'.

Figure 10:
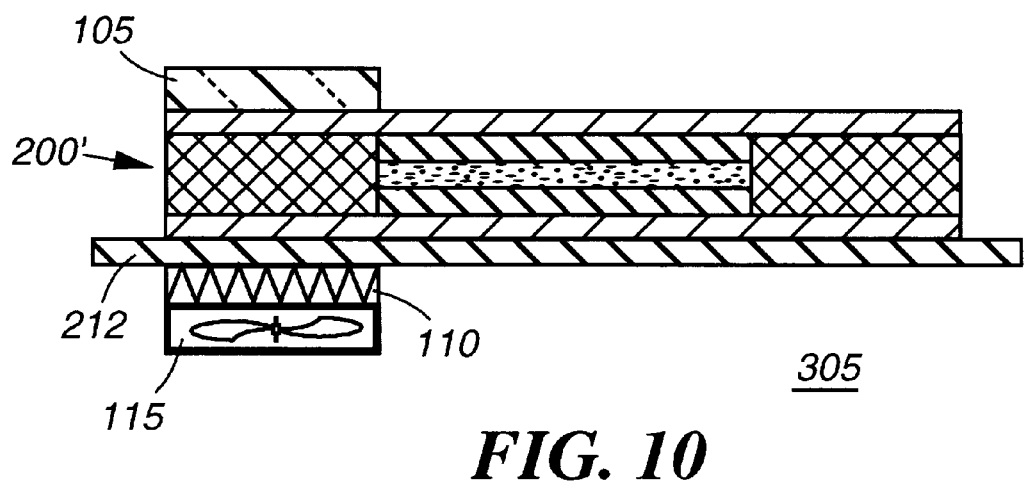
FIG. 10 is a side view of a configuration for using the capacitor of FIG. 9 to thermally manage heat generated by an electrical component in accordance with the alternative embodiment of the present invention.

FIG. 10 depicts a side view of an assembly using the capacitor 200' for thermal management purposes. As shown, the capacitor 200' is mounted to the pc board 212, and the microprocessor 105 is mounted on top of the capacitor 200 and vertically aligned with as much of the heat sink material as possible. The heat exchanger 110 and the fan 115 are mounted on the opposite surface of the pc board 212 from the capacitor 200' and are also vertically aligned with the heat sink material.

The capacitor described above has been shown as a planar, layered device. It will be appreciated, however, that other configurations could instead be implemented. For instance, a cylindrical core of heat sink material could be provided, and capacitive layers, e.g., electrodes and electrolyte layers, could be wound about the core. The heat generating device could then be situated at an end of the cylindrical capacitor so that heat flows in the direction of the cylinder axis to a fan and heat exchanger situated at the other end of the capacitor.

Alternatively, a long sheet of aluminum could serve as a current collecting substrate, on top of which could be disposed an electroactive layer, an electrolyte layer, another electroactive layer, and another sheet of aluminum. The layered assembly could then be wound to form a cylindrical capacitor. If a heat generating device is then placed at an end of the cylindrical capacitor, heat would be transferred transversely across the aluminum layers to a heat dissipating device, e.g., a fan, situated at the other end of the capacitor. In this configuration, the substrate can be formed from any material that can both collect current and transfer heat.

In summary, the electrochemical capacitor as described above can be used advantageously for thermal management of heat generated within an electronic device, such as a cellular telephone or a computer. More specifically, an electrochemical capacitor in accordance with the present invention can be vertically mounted with a heat generating component, such as a microprocessor, and related heat exchangers and fans to conduct heat from the microprocessor to the heat exchanger and fan. The electrochemical capacitor is fabricated with an active portion, which includes electrode and electrolyte layers, and a heat sink portion that is formed by filling an area between the substrates with a heat sink material that has desirable thermal conduction properties. The heat sink portion is preferably manufactured so that its surface area corresponds to the surface area of the heat generating component for which it is used. In this manner, a capacitor, a heat generating component, a heat exchanger, and a fan can all be mounted in a single region of a pc board so that space within the electronic device is efficiently used.

A further advantage of a thermal management assembly in accordance with the present invention is that microprocessor applications typically have stringent requirements for the allowable equivalent series resistance (ESR) and the equivalent series inductance (ESL) to maintain adequate functionality. As leads between the microprocessor and components connected thereto lengthen, the ESL and ESR increase. However, by mounting necessary capacitors formed in accordance with the present invention to the microprocessor as described above, lead length is conveniently minimized, thereby decreasing the ESR and ESL.

It will be appreciated by now that there has been provided a new way to manage heat generated by components in small electronic devices.

What is claimed is:

1. An electronic device, comprising:

a component that generates heat;

an electrochemical capacitor used for thermal management, the electrochemical capacitor comprising a first region including electroactive material and an electrolyte and a second region including heat sink material; and a printed circuit board to which the component and the electrochemical capacitor are mounted such that the component is aligned with the heat sink material of the electrochemical capacitor.

2. The electronic device of claim 1, wherein:

the electrochemical capacitor further comprises first and second substrates;

the electroactive material and the electrolyte are distributed between the first and second substrates within perimeter regions of the electrochemical capacitor; and the heat sink material is distributed between the first and second substrates within inner regions of the electrochemical capacitor.

3. The electronic device of claim 1, wherein:

the electrochemical capacitor further comprises first and second substrates;

the electroactive material and the electrolyte are distributed between the first and second substrates within inner regions of the electrochemical capacitor; and the heat sink material is distributed between the first and second substrates within perimeter regions of the electrochemical capacitor.

4. The electronic device of claim 1, wherein the heat sink material is thermally conductive and electrically insulative.

5. The electronic device of claim 1, further comprising:

a fan for dissipating the heat; and a heat exchanger positioned between the component and the fan, wherein the heat sink material of the electrochemical capacitor conducts the heat from the component to the heat exchanger.

6. An electrochemical capacitor used for thermal management, the electrochemical capacitor comprising:

a first region including electroactive material and an electrolyte; and a second region including heat sink material;

wherein the heat sink material is thermally conductive and electrically insulative;

wherein the electrochemical capacitor is a multiple-cell capacitor.

7. An electronic device, comprising:

a component that generates heat; and an electrochemical capacitor used for thermal management, the electrochemical capacitor comprising:
- a first region including electroactive material and an electrolyte; and
- a second region including heat sink material, wherein the second region is aligned with the component.

8. The electronic device of claim 7, wherein:
the electrochemical capacitor further comprises first and second substrates;
the electroactive material and the electrolyte are distributed between the first and second substrates within perimeter regions of the electrochemical capacitor; and
the heat sink material is distributed between the first and second substrates within inner regions of the electrochemical capacitor.

9. The electronic device of claim 7, wherein:
the electrochemical capacitor further comprises first and second substrates;
the electroactive material and the electrolyte are distributed between the first and second substrates within inner regions of the electrochemical capacitor; and
the heat sink material is distributed between the first and second substrates within perimeter regions of the electrochemical capacitor.

10. The electronic device of claim 7, wherein the heat sink material is thermally conductive and electrically insulative.

11. The electronic device of claim 10, wherein the heat sink material includes a ceramic-filled adhesive.

12. The electronic device of claim 10, wherein the heat sink material includes polyamide.

13. The electronic device of claim 7, further comprising:
a fan for dissipating the heat; and
a heat exchanger positioned between the component and the fan, wherein the heat sink material of the electrochemical capacitor conducts the heat from the component to the heat exchanger.

14. The electronic device of claim 13, further comprising a printed circuit board having first and second surfaces, wherein:
the electrochemical capacitor is mounted to the first surface of the printed circuit board, and the component is mounted to the electrochemical capacitor; and
the heat exchanger is mounted to the second surface of the printed circuit board beneath the electrochemical capacitor, and the fan is mounted to the heat exchanger.

15. The electronic device of claim 13, further comprising a printed circuit board having first and second surfaces, wherein:
the electrochemical capacitor is mounted to the first surface of the printed circuit board, the heat exchanger is mounted to the electrochemical capacitor, and the fan is mounted to the heat exchanger; and
the component is mounted to the second surface of the printed circuit board beneath the electrochemical capacitor.

16. The electronic device of claim 13, further comprising a printed circuit board to which the component is mounted, wherein the electrochemical capacitor is mounted to the component, the heat exchanger is mounted to the electrochemical capacitor, and the fan is mounted to the heat exchanger.

* * * * *